Sept. 1, 1936.  R. N. LINDNER ET AL  2,052,780
WATER POWER MOTOR
Filed May 24, 1935  2 Sheets-Sheet 1
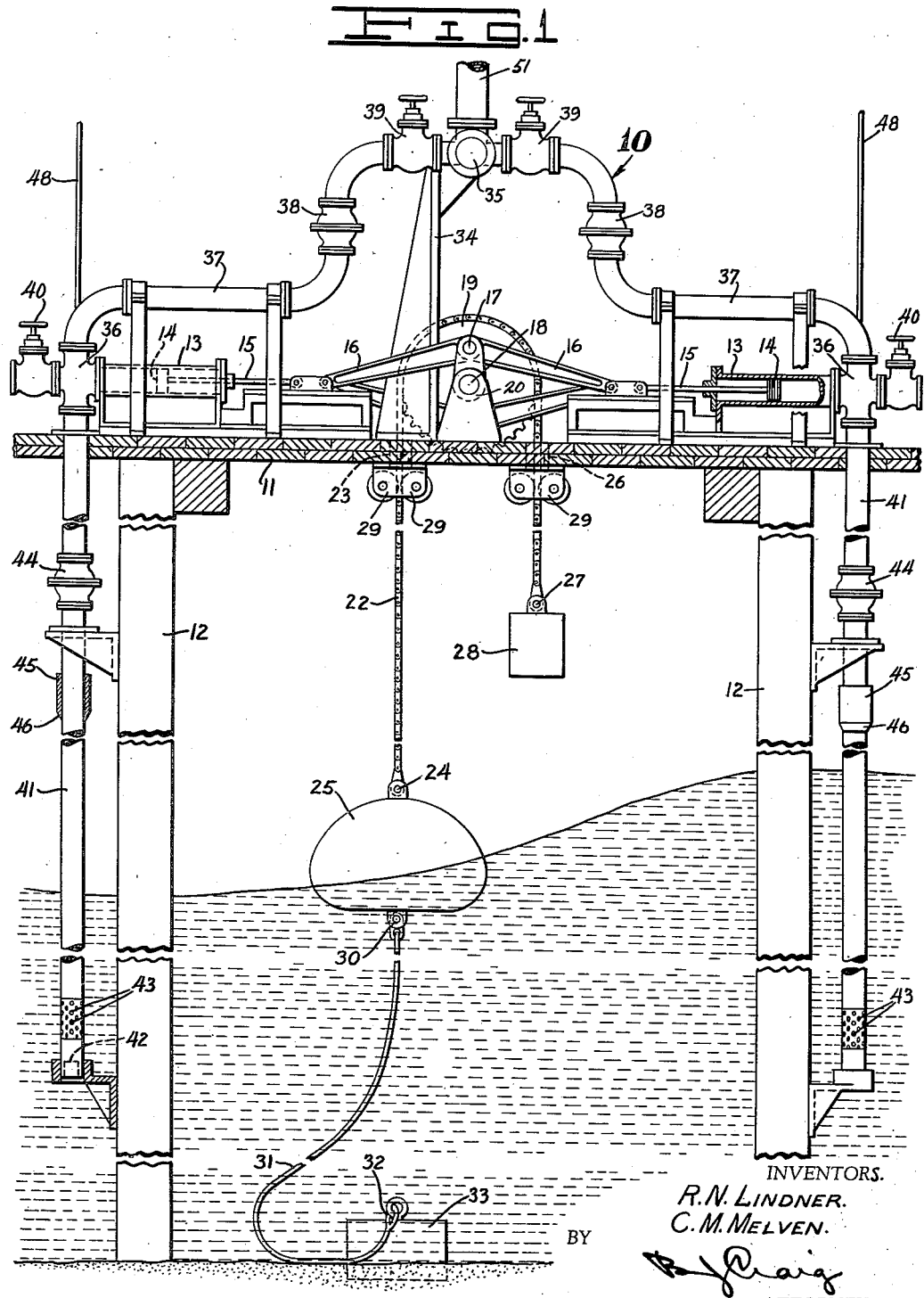
INVENTORS.
R. N. LINDNER.
C. M. MELVEN.
BY
ATTORNEY.

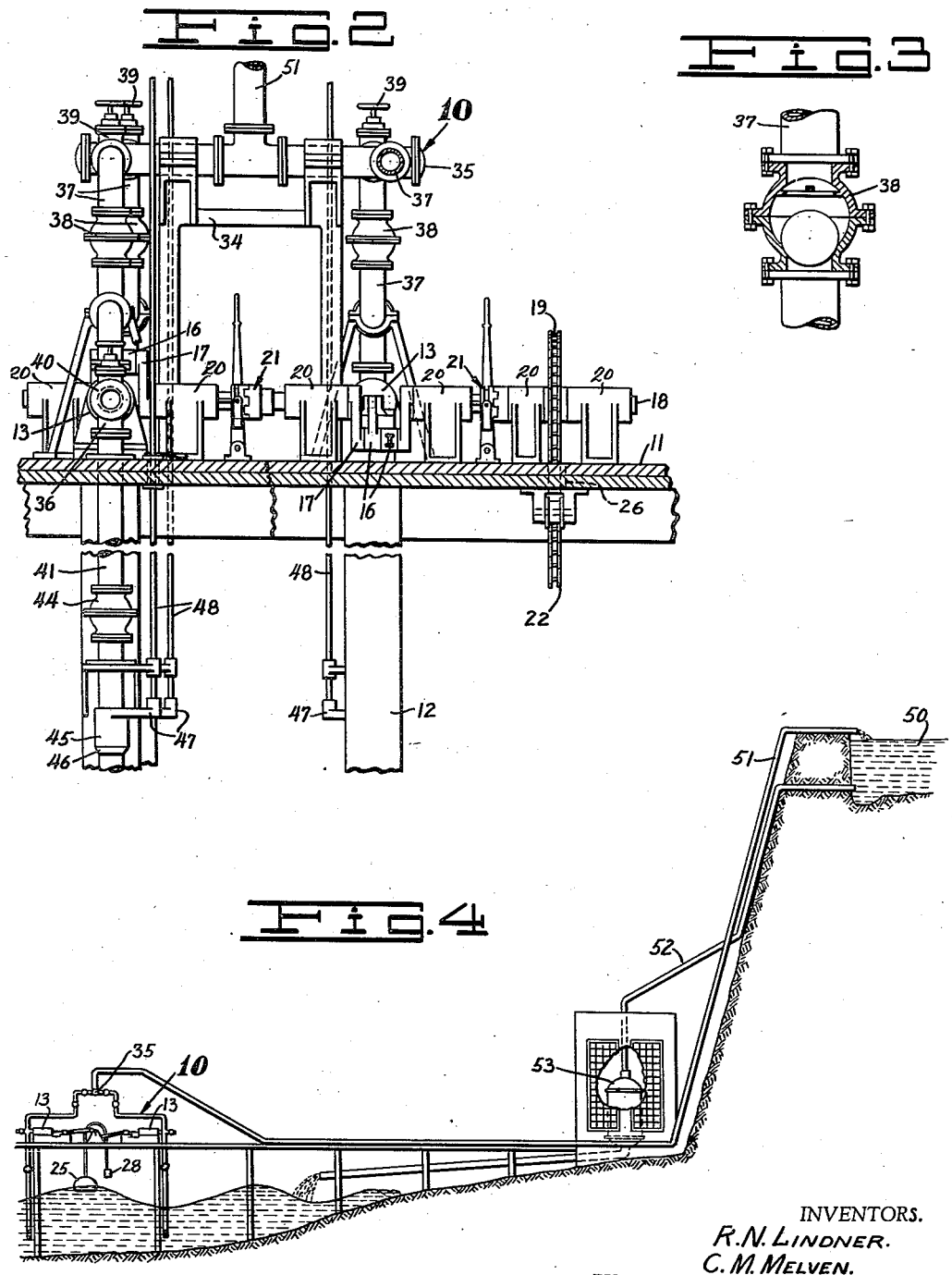

Patented Sept. 1, 1936

2,052,780

UNITED STATES PATENT OFFICE 2,052,780

WATER POWER MOTOR

Ralph N. Lindner, Van Nuys, and Chester M. Melven, Burbank, Calif.; said Lindner assignor to said Melven Application May 24, 1935, Serial No. 23,224

3 Claims. (Cl. 60—8)

This invention relates to a water power motor. The general object of the invention is to provide an improved water power motor which is so constructed that it can be economically manufactured and which is highly efficient in use.

A further object of the invention is to provide a water power motor including a plurality of reciprocating pump members which are operated in a novel manner.

Other objects of the invention will be apparent from the following description taken in connection with accompanying drawings, wherein Fig. 1 is a section partly in elevation showing a motor embodying the features of our invention;

Fig. 2 is a longitudinal secton showing the invention;

Fig. 3 is a sectional detail showing one of the valves, and

Fig. 4 is a diagrammatical view showing an installation involving our invention.

Referring to the drawings by reference characters we show our invention as embodied as a water power motor which is indicated generally at 10. As shown the motor is mounted on a platform 11 which is supported on posts 12, although any other suitable method of support may be provided. The platform 11 is built above a turbulent body of water such as an ocean or lake.

Mounted upon the platform 11 we show a plurality of pairs of opposed cylindrical members 13. We may employ one of these pairs of cylinders or a plurality of pairs depending on the requirements.

Each of the cylinders is provided with a piston 14 and a piston rod 15 and the piston rods having connecting rods 16 thereon which engage a crank portion 17 of a crank shaft 18. Mounted upon the crank shaft 18 we show a sprocket 19 which is suitably secured to the crank shaft 18. The crank shaft 18 is shown as supported in bearings 20 and may be separated into a plurality of sections which are connected by suitable clutch means as indicated at 21.

Positioned over the sprocket 19 we provide a sprocket chain 22 one reach of which extends downward through an aperture 23 in the platform 11 and is suitably secured as at 24 to a float member 25. The other reach of the sprocket chain 22 extends downward through an aperture 26 in the platform 11 and is suitably secured as at 27 to a counter weight member 28. The weight of the counterweight member 28 is preferably approximately one half of the weight of the float 25.

The two reaches of the chain 22 after passing through the apertures 23 and 26 are preferably positioned in roller guide members such as indicated at 29.

Connected to the underside of the float 25 as at 30 we provide an anchor cable 31 which is connected as at 32 to a suitable anchor member 33. Supported above the platform 11 by a frame 34 we provide a header member 35.

Opposite the piston rod 15 each of the cylinders 13 opens into a cross pipe fitting 36 the upper end of which communicates with the header 35 through a pipe 37. Interposed in each of the pipes 37 we provide a check valve 38 which is shown in detail in Fig. 3. These check valves 38 allow unrestricted passage through the pipe from the cylinders to the header and restricts passageway from the header to the cylinders.

Interposed in each of the pipes 37 between the header and the check valve 38 we may provide a shutoff valve 39. Opposite its associated cylinder 13 each cross fitting 36 communicates with a shutoff valve 40. The lower end of each cross fitting 36 communicates with a pipe 41 which extends downward to a location below the surface of the water. The lower ends of each of the pipes 41 is closed as by a plug 42 and has inlet perforation 43 therein above the plug. Interposed in each of the pipes 41 between the cross fitting 36 and the intake perforation 43 we provide a check valve 44 which is similar in all respects to the check valve 38 shown in Fig. 3. The check valves 44 allow free passageway upward in their associated pipes but restrict downward passageway therethrough.

Positioned on each of the pipes 41 below the check valves 44 we provide a sleeve member 45 which includes a sharpened or bevelled front end 46. Each sleeve 45 includes a horizontal arm portion 47 to which a vertical rod 48 is secured. The rods 48 extend upward above the platform 11 from which they may be manually or otherwise reciprocated to vertically slide the sleeves 46 along their associated pipes 41 to remove any accumulated sea growths from the pipe and particularly from the perforated section.

In operation the valves 39 are opened and the valves 40 closed, then as waves lift the float 25 the counter weight 28 through the medium of the chain 22 and sprocket 19 rocks the crank shaft 18 in one direction and as the waves recede the weight of the float 25 through the medium of the chain and sprocket rocks the crank shaft in the opposite direction.

As the crank shaft is thus rocked the pistons are reciprocated in their associated cylinders at one time moving away from their associated cross fittings and at other times moving towards the cross fittings so that at intervals a partial vacuum is formed in the pipes 41 and cylinder whereupon water is drawn into the pipes 41 through the perforations 43 and trapped above the check valve 44 whereupon upon the next movement of the piston towards the cross fitting the water above the check valve 44 is forced through the pipes 37 past the check valve 38 into the header 35. If desired the motor may be primed by running water into the pipe 37 through the valve 40 until it rises above the valve 38.

In Fig. 4 we have shown a diagrammatic operative installation of our water power motor in combination with a hydro electric plant. As shown the water from the header 35 is directed to an elevated reservoir 50 through a pipe 51 and from the reservoir the water is directed downwardly through a pipe 52 to the intake of a suitable water pressure operated device such as a turbine and electric generator unit 53.

Although we have shown and described our invention as embodied in a device for pumping water it will be understood that it is readily adapted for pumping air or other types of fluid.

From the foreging description it will be apparent that we have provided a novel water power motor which is simple in construction and highly efficient in use.

Having thus described our invention we claim:

1. In a water power motor, a support, a pair of opposed cylinders mounted on said support, a piston in each cylinder, a crank member mounted on said support, means connecting the crank member with said pistons, a shaft on which said crank member is mounted, a sprocket on said shaft, a single chain positioned over said sprocket, means to guide said chain, a weight on said chain and normally disposed above the water line, a single float member on said chain, said float being normally partially submerged, said float being heavier than said weight, an inlet pipe extending from said cylinder and having an aperture therein disposed below the water line, a one-way valve in said inlet pipe, an outlet pipe communicating with the cylinder and with the inlet pipe and a one-way valve in said outlet pipe.

2. In a water power motor, a base, a pair of spaced opposed cylinders mounted on said base, a piston in each of said cylinders, a crank member mounted on said base between said cylinders, means connecting the crank member with each of said pistons, a shaft on which said crank member is mounted, a sprocket on said shaft, a single chain positioned over said sprocket, means beneath the base to guide said chain, a weight on one end of said chain and normally disposed above the water line, a single float adapted to rest on the water and secured to the other end of said chain, said float being normally partially submerged, said float being heavier than said weight, an inlet pipe extending from each of said cylinders and having an open end disposed below the water line, a one-way valve in each inlet pipe, a single outlet pipe including branches communicating with all of the cylinders and with the inlet pipes and a one-way valve in each branch of said outlet pipe.

3. In a water power motor, a support including posts, a pair of opposed cylinders mounted on said support, a piston in each of said cylinders, a crank member mounted on said support, means connecting the crank member with each of said pistons, a shaft on which said crank member is mounted, a sprocket on said shaft, a single chain positioned over said sprocket, means to guide said chain, a weight on said chain normally disposed above the water line, a single float adapted to rest on the water and secured to said chain, means to limit the lateral swing of said float, said float being heavier than said weight, an inlet pipe extending from each of said cylinders and having an outlet therein disposed below the water line, means on said posts to support said inlet pipes, a valve in each inlet pipe, a cross fitting at the end of each inlet pipe, each cross fitting being disposed adjacent one end of a cylinder and connected thereto, a priming valve disposed on a cross and located opposite to said cylinder, an outlet pipe connected to the other face of said cross, a one-way valve in said outlet pipe and means connecting all of said outlet pipes.

RALPH N. LINDNER.
CHESTER M. MELVEN.